United States Patent
Fuchs et al.

(10) Patent No.: US 6,189,956 B1
(45) Date of Patent: Feb. 20, 2001

(54) INDUSTRIAL TRUCK WITH A DRIVER'S CAB

(75) Inventors: Ivo Fuchs, Schulendorf; Matthias Schultz, Neu-Krenzlin, both of (DE)

(73) Assignee: Still GmbH (DE)

( * ) Notice: Under 35 U.S.C. 154(b), the term of this patent shall be extended for 0 days.

(21) Appl. No.: 09/452,708

(22) Filed: Dec. 2, 1999

(30) Foreign Application Priority Data

Dec. 3, 1998 (DE) .......................................... 298 21 628 U

(51) Int. Cl.⁷ .................................................... B60J 7/00
(52) U.S. Cl. .................................. 296/190.1; 296/146.15; 296/96.21
(58) Field of Search ............................ 296/190.1, 146.15, 296/96.21, 146.16, 201; 180/89.12

(56) References Cited

U.S. PATENT DOCUMENTS

| | | | |
|---|---|---|---|
| 3,519,298 | * | 7/1970 | Gley et al. ........................... 292/113 |
| 3,770,312 | * | 11/1973 | Shadburn .......................... 296/190.1 |
| 3,967,859 | * | 7/1976 | Whisler .............................. 296/190.1 |
| 3,998,489 | * | 12/1976 | Blakeslee .......................... 296/190.1 |
| 4,116,483 | * | 9/1978 | Kramer et al. ..................... 296/190.1 |
| 4,679,847 | * | 7/1987 | Dirck ................................. 296/190.1 |
| 4,758,039 | * | 7/1988 | Ohhazama et al. ............. 296/146.15 |
| 5,413,397 | * | 5/1995 | Gold ................................ 296/146.15 |
| 5,450,917 | * | 9/1995 | Goddard ........................... 296/190.1 |
| 5,655,341 | * | 8/1997 | Jaffiol et al. ...................... 52/204.54 |
| 5,664,519 | * | 9/1997 | Erskine ........................... 296/146.15 |
| 5,857,730 | * | 1/1999 | Korpi et al. ....................... 296/96.21 |
| 5,975,615 | * | 11/1999 | Showalter ......................... 296/96.21 |

\* cited by examiner

*Primary Examiner*—Joseph D. Pape
*Assistant Examiner*—Kiran Patel
(74) *Attorney, Agent, or Firm*—Webb Ziesenheim Logsdon Orkin & Hanson, P.C.

(57) ABSTRACT

An industrial truck has a driver's cab with two, spaced-apart guides into which the upper and lower edges of the windshield are engaged. The windshield can be removed and replaced by bending or sliding the windshield to disengage the edges of the windshield from the guides. The windshield is held in place in the guides by fastening devices, such as hold-down plates located at the sides of the windshield.

6 Claims, 2 Drawing Sheets

INDUSTRIAL TRUCK WITH A DRIVER'S CAB

BACKGROUND OF THE INVENTION

1. Field of the Invention

This invention relates generally to an industrial truck having a driver's cab and a windshield fastened to the driver's cab.

2. Description of the Currently Available Technology

Industrial trucks, such as fork lift trucks, for example, can be equipped with windshields if the conditions in the environment where the industrial trucks are used make such equipment necessary. When industrial trucks are used outdoors, in refrigerated warehouses or in dusty environments, for example, a closed driver's cab having a windshield is typically part of the conventional equipment of the industrial truck.

In certain applications, such as in foundry operations for example, the windshield is exposed to extreme wear. However, known devices to protect the windshield from heat, splashing metal, metal vapor and dust frequently obstruct the driver's view through the windshield or do not work satisfactorily, as a result of which the windshield typically must be replaced frequently.

When the windshield is fastened to the driver's cab by means of threaded fasteners or weatherstripping, the replacement of the windshield is both expensive and time-consuming. On windshields that are held in place by means of threaded fasteners, the new windshield must be provided with the corresponding screw holes, while the fastening of the windshield by means of weatherstripping (i.e. specially shaped rubber profiles) is a very time-consuming operation.

Therefore, it is an object of this invention to provide an industrial truck on which the windshield can be replaced more rapidly and economically than is currently possible.

SUMMARY OF THE INVENTION

The invention teaches that the driver's cab, e.g. of an industrial truck, has two guides, with two edges, e.g., opposite edges, of the windshield guided in or slidably engagable with the guides. The guides can be realized in the form of guide rails, for example. The windshield can be pushed or slid along in the guides and thus relative to the driver's cab. The windshield can be removed by pushing or pulling the windshield in a first direction all the way out of the guide rails. In an analogous manner, a new windshield can be inserted in the guides by pushing the new windshield in the guide rails in the opposite direction, i.e., in a direction opposite to the first direction.

It is particularly advantageous if the windshield is made out of polycarbonate. Polycarbonate has been found to be particularly useful, for example, in the use of such trucks in foundry operations. Compared to glass panels, polycarbonate panels have been found to be extremely heat-resistant and fracture-proof. The elasticity of polycarbonate allows windshields made of this material to bend. Consequently, the windshield can be inserted in the guides from the frontal direction of the industrial truck, if the windshield is bent appropriately. Then the windshield is released and springs back into its original shape, and is thereby held firmly in the guides.

A simple replacement of the windshield is made possible if the guides are oriented substantially horizontally with respect to the industrial truck, in which case a top edge and a bottom edge of the windshield are guided in the guides. The weight of the windshield is thus supported by the lower guide, while the upper guide secures the windshield against falling out.

It is appropriate if, located on the driver's cab, there is at least one fastening means or device that is engagable with at least one windshield edge that is not guided in a guide. The fastening means prevent an unintentional displacement as well as a shaking or rocking of the windshield in the guides during normal use. The fastening means can be realized, for example, in the form of a hold-down plate that is located along an edge of the windshield not engaged in one of the guides.

The fastening means are detachably connected with the driver's cab, preferably by means of threaded fasteners.

The windshield can be manufactured particularly easily and economically if it is made flat, i.e., planar. For example, it is possible that the user of an industrial truck can cut the windshields out of polycarbonate sheets.

The cutting of the windshields is particularly simple if the windshield has a substantially rectangular shape.

BRIEF DESCRIPTION OF THE DRAWINGS

Additional advantages and details of the invention are explained below in greater detail with reference to the exemplary embodiment illustrated in the accompanying drawing figures in which like reference characters identify like parts throughout.

DESCRIPTION OF THE PREFERRED EMBODIMENT

Figure 1:
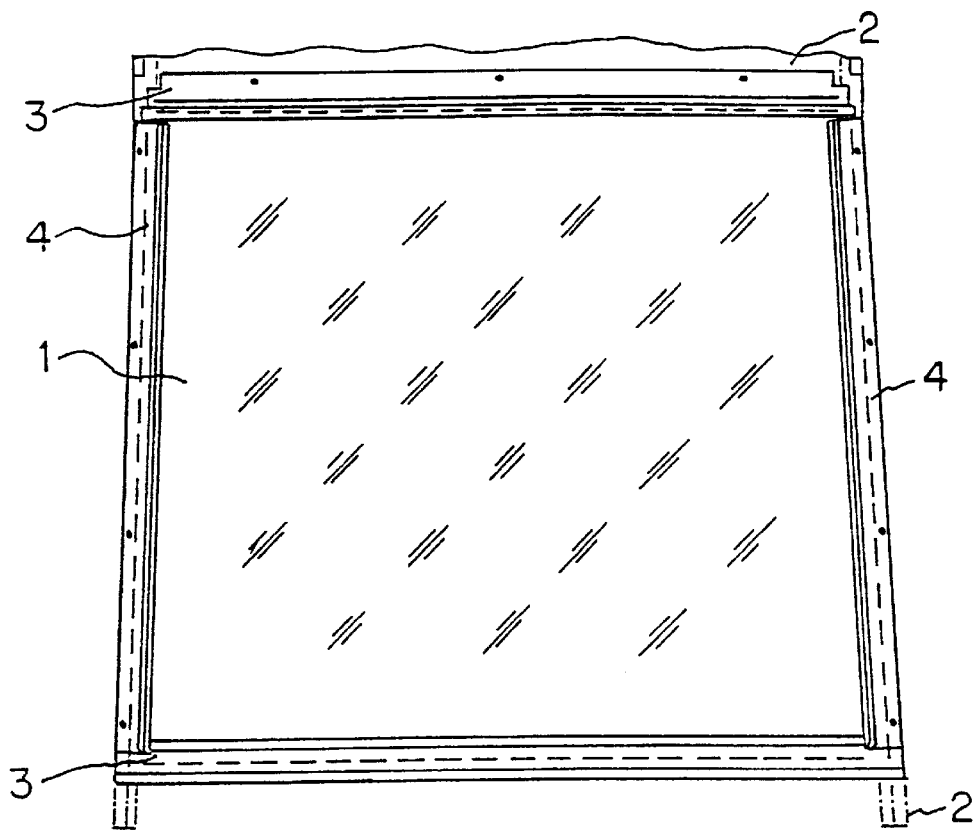
FIG. 1 is a front view of a windshield of the invention mounted on a driver's cab.

For purposes of the description hereinafter, the terms "upper," "lower," "right," "left," "vertical," "horizontal," "top," "bottom" and similar directional terms shall relate to the invention as it is oriented in the drawing figures. However, it is to be understood that the invention may assume various alternative variations and orientations except where expressly specified to the contrary.

FIG. 1 shows a windshield 1 which is fastened to a driver's cab 2 of an industrial truck in a front or "head-on" view from outside the industrial truck, i.e., standing in front of the industrial truck and looking at the windshield 1. The driver's cab 2 has a base frame made of metal sections, to which the various windows, doors and walls of the driver's cab 2 are fastened in conventional manner.

The top edge and the bottom edge of the windshield 1 are located in guides 3, which in this exemplary embodiment are realized in the form of guide rails which provide a substantially U-shaped channel and are connected to the driver's cab 2 by threaded fasteners. On the side edges of the windshield 1 there are fastening means 4 that are preferably realized in the form of conventional hold-down plates, which are also fastened to the driver's cab 2 or to a component that is fastened to the driver's cab 2 by threaded fasteners.

Figure 2:
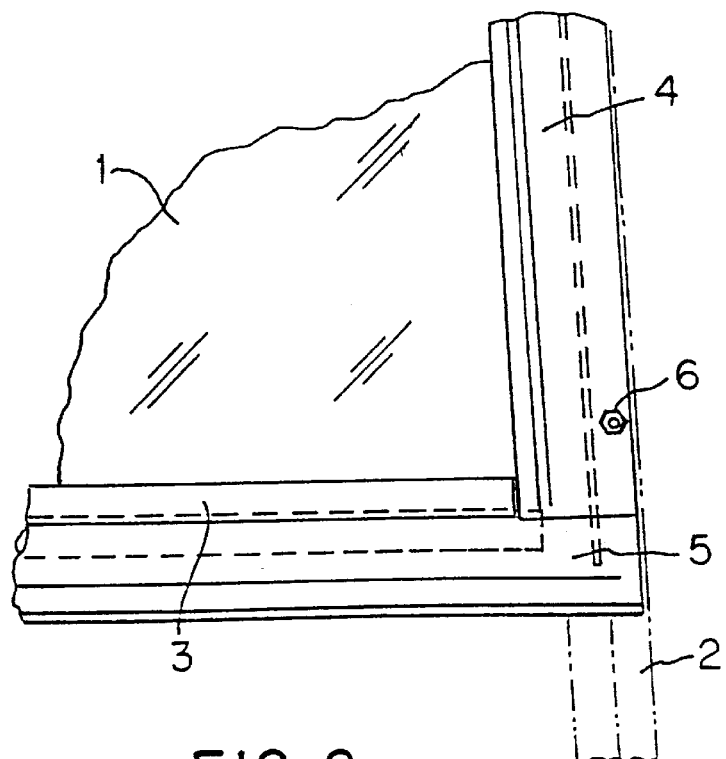
FIG. 2 is a detail view of the lower right corner of the windshield shown in FIG. 1.

FIG. 2 shows the lower right-hand portion of FIG. 1 in an enlarged view. The figure shows in particular an encircling windshield frame 5, in which the windshield 1 is installed. The lower guide 3 is firmly connected with the windshield frame 5. The fastening means 4, on the other hand, are detachably fastened to the windshield frame 5 by screws 6. At least one fastening means 4 should be removed to replace the windshield 1.

Figure 3:
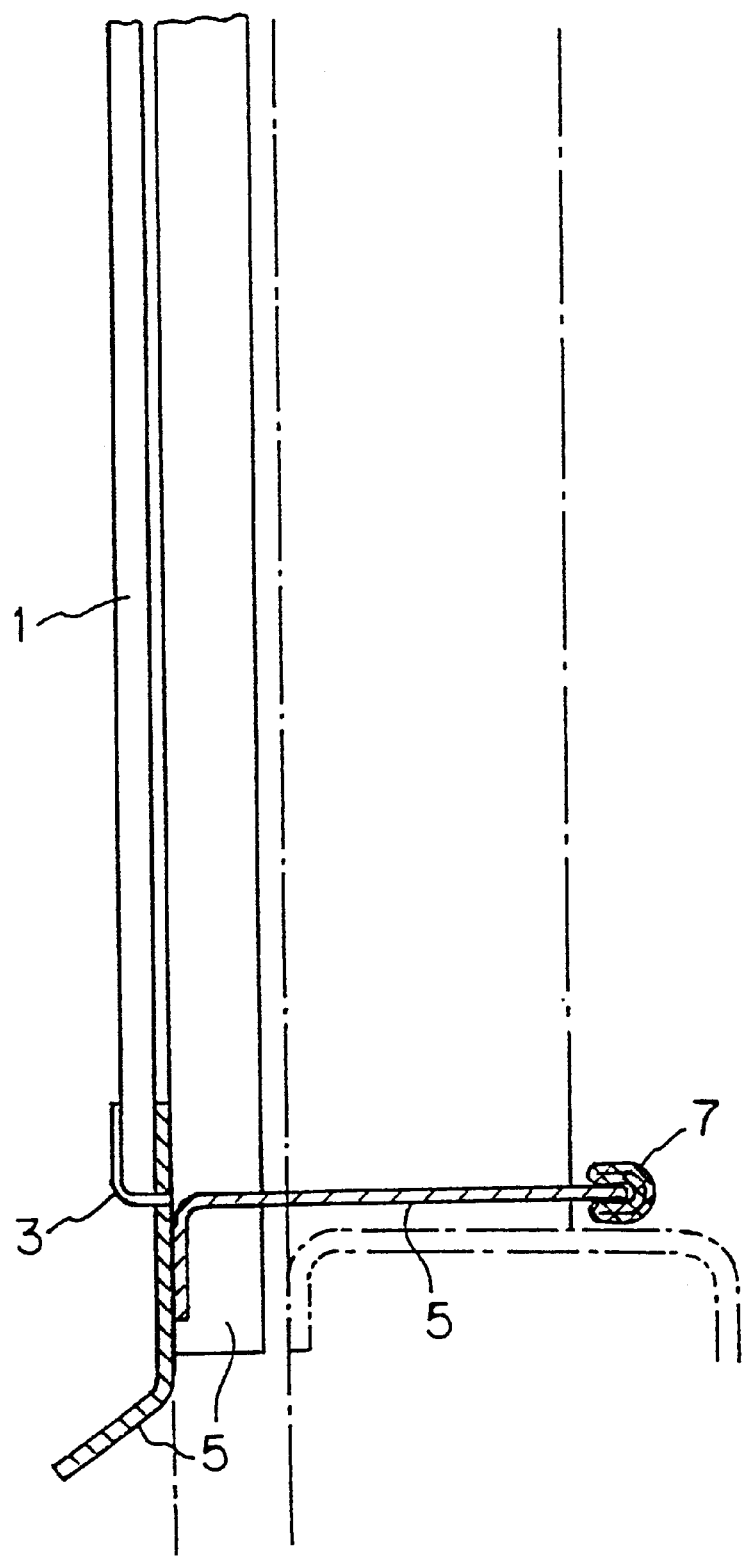
FIG. 3 is a side, cross-sectional view of a windshield of the invention on a driver's cab.

FIG. 3 shows, in a vertical cross section, a right side of the windshield 1 on the driver's cab 2, which driver's cab 2 is illustrated in broken lines. The windshield frame 5 is sealed with respect to the driver's cab 2 by a rubber element 7. The figure also shows the lower guide 3 in which the windshield 1 is inserted. The lower guide 3 defines a substantially U-shaped channel into which the lower edge of the windshield 1 is engaged, e.g., by sliding the windshield 1 into the channel from the side and pushing the windshield 1 until the windshield is in proper position in the frame or until the opposite side (left side) of the windshield 1 contacts the fastening means 4 on the opposite side (left side) of the frame 5. The upper edge of the windshield 1 is similarly engaged in the upper guide 3 such that the windshield 1 is firmly held in place by the upper and lower guides 3. When the windshield 1 is in place, the rightmost fastening means 4 can be attached to the cab 2, e.g., by screws 6, to hold the windshield 1 in place.

The windshield 1 can be removed, for example, by removing one of the fastening means 4, e.g., the rightmost fastening means 4, and pushing the windshield 1 to the right along and then out of the guides 3. It is also possible to remove the windshield 1 by bending the windshield 1 in an axis directed in the plane of the drawing, so that the windshield 1 jumps out of the guide 3, i.e., bowing the windshield 1 outwardly with respect to FIG. 3 such that the top and bottom edges of the windshield 1 slip out of the U-shaped channels. A new windshield 1 can then be inserted using the reverse procedure.

The arrangement of the invention provides a fast and economical replacement of the windshield 1 of the industrial truck, wherein no special tools are necessary. The steps for the process of the invention can be performed by the operators of the industrial truck themselves.

It will readily be appreciated by those skilled in the art that modifications may be made to the invention without departing from the concepts disclosed in the foregoing description. Such modifications are to be considered as included within the scope of the invention. Accordingly, the particular embodiments described in detail hereinabove are illustrative only and are not limiting as to the scope of the invention, which is to be given the full breadth of the appended claims and any and all equivalents thereof.

What is claimed is:

1. An industrial truck having a driver's cab, comprising:
   two guides connected to the driver's cab;
   a windshield removably carried on the driver's cab by the guides, wherein the guides are oriented substantially horizontally with respect to the industrial truck, and wherein a top edge and a bottom edge of the windshield are engaged in the guides; and
   at least one elongated hold down plate connected to the driver's cab and engaging a side edge of the windshield.

2. The industrial truck as claimed in claim 1, wherein the windshield is made of polycarbonate.

3. The industrial truck as claimed in claim 1, wherein the at least one elongated hold down plate is detachably connected to the driver's cab.

4. The industrial truck as claimed in claim 1, wherein the windshield is substantially planar.

5. The industrial truck as claimed in claim 1, wherein the windshield is substantially rectangular.

6. The industrial truck as claimed in claim 3, wherein the fastening means are detachably connected to the driver's cab by threaded fasteners.

* * * * *